US011182378B2

(12) United States Patent
Charles et al.

(10) Patent No.: US 11,182,378 B2
(45) Date of Patent: Nov. 23, 2021

(54) SYSTEM AND METHOD FOR COMMITTING AND ROLLING BACK DATABASE REQUESTS

(71) Applicant: Walmart Apollo, LLC, Bentonville, AR (US)

(72) Inventors: Kevin M. Charles, Bentonville, AR (US); John Randy Frerking, Prairie Grove, AR (US); Richard Jackson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 181 days.

(21) Appl. No.: 16/183,508

(22) Filed: Nov. 7, 2018

(65) Prior Publication Data

US 2019/0138633 A1    May 9, 2019

Related U.S. Application Data

(60) Provisional application No. 62/583,180, filed on Nov. 8, 2017.

(51) Int. Cl.
*G06F 16/23* (2019.01)
*G06F 9/46* (2006.01)

(52) U.S. Cl.
CPC .......... *G06F 16/2379* (2019.01); *G06F 9/466* (2013.01); *G06F 16/2308* (2019.01); *G06F 16/2365* (2019.01)

(58) Field of Classification Search
CPC .. G06F 16/2379; G06F 16/2308; G06F 9/466; G06F 16/2365
See application file for complete search history.

(56) References Cited

U.S. PATENT DOCUMENTS

| | | |
|---|---|---|
| 6,321,234 B1 | 11/2001 | Debrunner |
| 8,504,523 B2 | 8/2013 | Starkey |
| 8,510,304 B1 | 8/2013 | Briggs et al. |
| 8,799,248 B2 | 8/2014 | Bulkowski et al. |
| 9,002,907 B2 | 4/2015 | San Martin et al. |
| 2002/0066051 A1* | 5/2002 | Hobson .................. G06F 9/466 714/16 |
| 2003/0212660 A1* | 11/2003 | Kerwin ................ G06F 16/252 |

(Continued)

OTHER PUBLICATIONS

Martin et al. "Near Real-Time Analytics with IBM DB2 Analytics Accelerator", pp. 579-588 (Year: 2013).*

(Continued)

*Primary Examiner* — Mark D Featherstone
*Assistant Examiner* — Kweku William Halm
(74) *Attorney, Agent, or Firm* — Duane Morris , LLP; Manita Rawat

(57) ABSTRACT

Systems, methods, and computer-readable storage media for processing database requests on a database hosted on a stateless, non-persistent computing environment are provided. A server stores database requests to insert update or delete data in a unit of work set identified by a unique code. The database requests are performed on the database upon receiving an instruction to commit the database requests to the database. If an instruction is sent to rollback a unit of work set the database remains unchanged. This allows a client to handle requests in logical groups.

20 Claims, 6 Drawing Sheets

(56) References Cited

U.S. PATENT DOCUMENTS

| | | | |
|---|---|---|---|
| 2004/0030739 A1* | 2/2004 | Yousefi 'zadeh | G06F 16/2471 709/201 |
| 2005/0193286 A1* | 9/2005 | Thatte | G06Q 10/10 714/48 |
| 2009/0327468 A1* | 12/2009 | Hirsch | G06F 9/54 709/223 |
| 2011/0252099 A1* | 10/2011 | Pattekar | G06Q 10/10 709/206 |
| 2015/0172412 A1 | 6/2015 | Escriva et al. | |
| 2016/0350357 A1 | 12/2016 | Palmer | |
| 2017/0193012 A1* | 7/2017 | Gupta | G06F 11/1469 |

OTHER PUBLICATIONS

Understanding Threads, Processes and Connections, Oracle Docs (Year: 2012).*

International Search Report and Written Opinion dated Jan. 17, 2019, issued in corresponding PCT Application No. PCT/US2018/59669.

Oracle NoSQL Database vs. Cassandra, published May 2017, pp. 1-8.

Appendix A. Using the Large Object API, http://docs.oracle.com/cd/NOSQL/html/GettingStartedGuide/lobapi.html (2 pages).

* cited by examiner

SYSTEM AND METHOD FOR COMMITTING AND ROLLING BACK DATABASE REQUESTS

CROSS-REFERENCE TO RELATED APPLICATIONS

This application claims priority of U.S. Provisional Patent Application No. 62/583,180 filed Nov. 8, 2017, which is incorporated herein by reference in its entirety for all purposes.

BACKGROUND

1. Technical Field

The present disclosure relates to a system and method for processing database requests by a remote server and, more specifically, to recording database requests in unit of work (UOW) sets and performing the database requests in the unit of work set after the unit of work set is closed.

2. Introduction

A system and method are disclosed which allows a user computing device (a "client") accessing a database located on a remote server to commit or rollback a set of database requests in NoSQL computing environments. The commit/rollback feature is a known method of database management that is used when editing standard query language (SQL) databases. In traditional SQL databases, modifications are not applied to the database until the modifications are expressly committed. Instead, the modifications are stored in a temporary location until a commit instruction is received. It is not until after the instruction is received that the modifications are performed on the database. Thus, the modifications performed since the last commitment may easily be undone by submitting a rollback instruction to the database. If rollback instruction is submitted, the data remains unchanged and the modifications discarded. This is also advantageous because modifications may be undone if a session times-out or fails. Here, the system is able to group transactions from a client because the client device connects to the server or storage device hosting the database and maintains that connection until the client choses to terminate it. Thus, all database requests received via the connection can be easily grouped together and stored in a temporary location until a commit or rollback instruction is received.

However, NoSQL environments are stateless and non-persistent by nature, thus the transport mechanism does not allow commit/rollback. Because NoSQL is stateless and non-persistent, the transport mechanism does not allow for commit/rollback features. The cloud may be one example of a NoSQL remote server based computing environment. The cloud is defined as having five characteristics: on-demand service; broad network access by standard client mechanisms (mobile phones, laptops, tablets, and workstations); dynamic demand-based assignment of provider resource pooling; elastically provisioned and released capabilities; and resource usage measuring and monitoring. Cloud and other shared storage computing systems are often non-persistent and stateless. Hosting a database in a stateless non-persistent environment advantageously allows the server to dynamically allocate access to the database in response to user demand. It also allows multiple users to access the database simultaneously.

Because these systems are non-persistent and stateless, a client connects with the server housing the database when the database request is initiated. After the database is accessed and the database request processed, the connection between the client and the server is terminated. If the user wants to make additional edits to the database, the client initiates a new connection. Thus, the traditional commit/rollback function cannot operate in this technical environment. Embodiments of the invention solve the technical problem of allowing commit/rollback functions in a stateless or non-persistent computer system.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A data storage system disclosed herein may comprise: one or more remote computer-readable storage mediums configured to form a non-persistent stateless connection with a client; one or more processors; a database hosted on the one or more remote computer-readable storage mediums; the one or more remote computer-readable storage mediums having instructions stored which, when executed by the processor, cause the one or more computer-readable storage mediums to perform actions comprising: generating a unit of work token containing a unique identification code and one or more parameters; recording the unit of work token in a unit of work repository; generating a unit of work set associated with the unit of work token; returning the unit of work token to the client; receiving one or more database requests from the client, the database requests including the unit of work token; recording the database requests in the unit of work set; and committing or rolling-back the database requests in the unit of work set based on an instruction to commit or rollback the unit of work set.

A computer-readable storage medium disclosed herein may store instructions which, when executed by a computing device, cause the computing device to perform a method comprising: generating a unit of work set with a unique identification code; sending the unique identification code to a client with a non-persistent stateless connection with the computer-readable storage medium; receiving two or more database requests having the unique identification code from two or more HTTP sessions; recording the two or more database requests in a unit of work set; and committing the two or more database requests in the unit of work set or rolling-back the two or more database requests in the unit of work set after the unit of work set is closed.

A method for processing database requests on a database hosted on a stateless non-persistent computing environment disclosed herein may comprise of: generating a unique identification code to identify a unit of work set; generating the unit of work set at a storage location and assigning one or more parameters to the unit of work set; receiving, by a remote server, database requests from a client and recording the database requests in the unit of work set; closing the unit of work set based the one or more parameters assigned to the unit of work set; and determining whether to perform the database requests in the unit of work set on the database after the unit of work set is closed.

Disclosed are systems, methods, and non-transitory computer-readable storage media for committing and rolling-back database requests on a NoSQL server. The disclosed system and method groups database requests into unit of work sets. The database requests are then committed to the database or rolled-back from the database as a unit upon receiving an instruction from the client.

DETAILED DESCRIPTION

Figure 1:
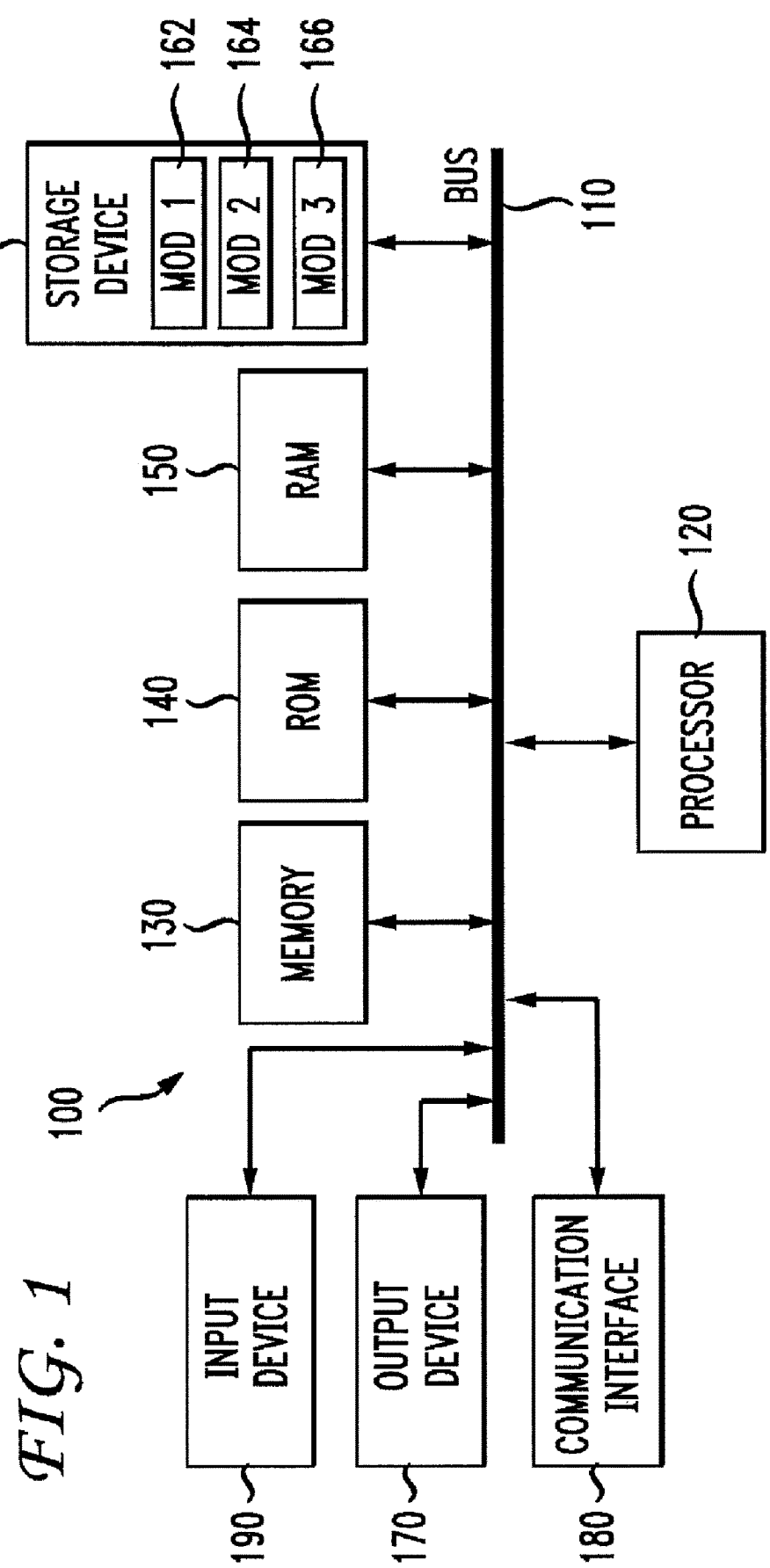
FIG. 1 illustrates an exemplary computer system.

Embodiments of the present invention extract and group multiple data packets coming from a client computer into unit of work sets. The unit of work sets that can be committed or rolled-back as a logical unit. The logical unit, called a unit of work set, includes multiple data packets that may instruct to modify a database ("database requests") that are stored in a unit of work repository. The grouped data packets are associated with a unique identification code so that they can be identified on the remote unit of work repository and recorded in the unit of work set with the corresponding unique identification code. This arrangement and association of specific data packets allows the database requests to be grouped in a logical set even when the database requests are sent over multiple sessions of connectivity. As noted above, embodiments of the invention solve the technical problem in stateless or non-persistent computer systems of committing or rolling back database actions.

Embodiments of the invention are advantageous particularly in client-server computing environments that use request-response type protocols such as HTTP. Request-response protocol can be used either to create a connection between client computers and server computers that persists so that multiple requests can be sent in a single session. The protocol can also be non-persistent such that the connection between the client and server is formed when the request is sent and the connection is terminated when the request is completed. Embodiments of the invention solve the technical problem of the commit-rollback feature operating in non-persistent connections by identifying the database modification requests ("database requests") with a unique identification code assigned to that set of database requests. The unique identification code may be assigned to a client by a remote server so that multiple clients accessing the database receive unique codes to identify discrete units of work. This allows multiple clients to make modifications to the database simultaneously.

In one embodiment, the unit of work set is committed or rolled-back automatically in response to a connection timeout or failure. Other embodiments commit or rollback unit of work sets after a duration of time has passed since the unit of work set was initiated, or when the number of records in a unit of work set exceeds a threshold. In some embodiments, a system automatically creates a new unit of work set after the previous unit of work set is committed or rolled-back so that the commitment or rollback is done periodically and continuously while accessing the database. Embodiments of the invention allows operations in NoSQL environments or other stateless, non-persistent environments, to commit or rollback large groups of database modifications, preserving database integrity and increasing the ease at which a user can undo mistaken modifications or incomplete modifications. Embodiments of the invention provide a new system, data associations, and data structures that overcome the problems of conventional systems.

For example, a client may initiate a unit of work set by first requesting a unique identification code. The code is used to identify a set of database requests (the "unit of work set") from the client. The database requests may include commands to insert, update (i.e. change the value), or delete data from the database. The unique identification code is generated and returned to the client. In applications where multiple clients access the database, the unique identification code may be generated by a remote server accessible by the multiple clients. The unique identification code may also be generated locally. In this example, the unique identification code will be referred to as "UID1." Next, the client determines whether the forthcoming database requests in the unit of work set should be committed to the database or rolled-back. Some embodiments may rollback all non-committed requests by default. This may be advantageous so that partial edits to the database that are not completed due to a time-out or connection failure are not made to the database. In other embodiments, this may advantageously prevent changes to the database unless the client expressly choses to commit the changes, this may advantageously prevent edits made in error from effecting the database. To commit the database requests the client can create a token with the unique identification code and the commit instruction, such as:

(UID1, commit).

The token may also include a set of parameters further discussed below. To rollback the forthcoming set of database requests, the client may create a token with the unique identification code and a rollback instruction, such as:

(UID1, rollback).

The client then sends the token to a unit of work repository for recording unit of work sets. The unit of work repository creates an empty set identified by the unit of work's unique identification code and containing the instruction, for example:

(UID1, commit)::[ ].

The client may then submit database requests to the unit of work repository to be recorded in the unit of work set. In stateless non-persistent computing environments, the client sends a request to connect to a port on the server hosting the unit of work repository. The server may instruct the client to form a connection to the server via a dynamically assigned port. When a connection is formed between the client and the server, the server receives the database request from the client. The database request may include the unique identification code, a command, and a value. For example, if the command is to insert the value "1000" at a location1 in the database, the database request may be in the form:

[UID1, insert, location1, 1000].

"[L]ocation1" may be an actual location or a pointer to a location on the database. The unit of work repository then searches for the unit of work set with UID1 in its header. Upon locating the corresponding unit of work set, the unit of work repository adds the content of the database request to the unit of work set. The resulting exemplary unit of work set reads:

(UID1, commit)[(insert, location1, 1000)].

In stateless non-persistent computing environments, the connection between the client and the server is terminated after the database request is received.

To send additional database requests to the unit of work set, the client can send a new request to connect to the server. The resulting connection may be at different port than the initial connection. After forming the connection, the client can send the additional database request. For example, the client may send a command to update the value at location2 to "2000," such a request may read:

[UID1, update, location2, 2000].

The unit of work repository again searches for a unit of work set with the heading containing UID and adds the contents of the second database request to the unit of work set so that the unit of work set reads:

(UID1, commit)::[(insert, location1, 1000), (update, location2, 2000)].

If the unit of work repository receives a third database request, such as (UID1, delete, location3) the process repeats so that the unit of work set reads:

(UID1, commit)::[(insert, location1, 1000), (update, location2, 2000), (delete, location3)].

The unit of work set may be closed by any of the methods discussed below. When the unit of work set is closed (or no longer "live") no additional database may be added to that unit of work set. At that point, the unit of work repository evaluates the token to determine whether to commit or rollback the database requests in the unit of work set. In this example, the instruction is to commit the database requests. The instruction may also be to rollback the database requests in the unit of work set. If the instruction is to commit, the unit of work repository sends the database the content of the database requests in the unit of work set. The database is modified in accordance with the database requests. In this example, "1000" is inserted at location1, the value at location2 is changed from its current value to "2000", and the value at location3 is deleted. If, instead, the token indicated that the database requests were to be rolled-back (such that the token instead read (UID1, rollback)) the modifications are not performed on the database and the database is unchanged by the database requests in the unit of work set.

In some embodiments, the database may be a key-value database. In these embodiments, the location of the data may be stored in a key store. Thus, in the above example, the client may send the database a command to insert "1000" at location1 as (UID, insert, key1, 1000). If, as described above, the unit of work repository is instructed to commit the unit of work containing request (UID1, insert, key1, 1000), the key store will be sent the key "key1." The key store may have various keys paired to locations in the database, for example:

[key1, location1]
[key2, location2]
[key3, location3]

The location associated with the key is retrieved and the command is performed at the location on the database associated with the key. In the above example, the key store searches for key1 and returns the location (or location pointer) location1 and inserts "1000" at that location.

U.S. Patent Application No. 2015/0302037 discloses a NoSQL, key/value store database that operates in a cloud-computing environment. The disclosed database is hosted on a web-based remote server accessible by multiple users from multiple remote locations. Users can send database request to insert, delete, or update the database using a key identifying the data to be inserted, deleted, or updated. The keys are paired with location pointers pointing to the location of the data on the database and the pairing is stored in a key store. For example, if a user sends an update request, the new data is stored at a location and the location pointer paired with the key is changed to reflect the new location of the data. The old data may then be deleted. When a user sends an insert requests, the new data is added to the database and the location is sent to the key store to generate a location pointer paired with a key identifying the new data. The key may be generated automatically or created by the user. When a user sends a delete request, the data is removed from the database and the key and location pointer are removed from the key store.

In some embodiments, users may be prevented from accessing data that has not yet been committed to the database or data that may be subject to a rollback. In these embodiments, a key store notes that the data is being altered so that other users may be prevented from accessing the data stored at the location while the key is the subject of a database request in a live unit of work set. This advantageously prevents a user from altering data that may not be current or overriding more recent data values.

The disclosed system may include two or more computer systems including the client device and a server. With reference to FIG. 1, an exemplary computer system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions including initiating a connection with a remote computing device and modifying information on that device. Other system memory 130 may be available for use as well. The memory 130 can include multiple different types of memory with different performance characteristics. It can be appreciated that the disclosure may operate on computing devices like computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. One such module may be an application programming interface (API) for controlling communications between various software components and computer devices. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular request includes the software component stored in a tangible computer-readable storage medium in connection with the necessary hardware components, such as the processor 120, bus 110, display 170, and so forth, to carry out the request. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the hard disk type storage device 160, other types of computer-readable media which can store data that are accessible by a computer, such as magnetic cassettes, flash memory cards, digital versatile disks, cartridges, random access memories (RAMs) 150, and read only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Figure 2:
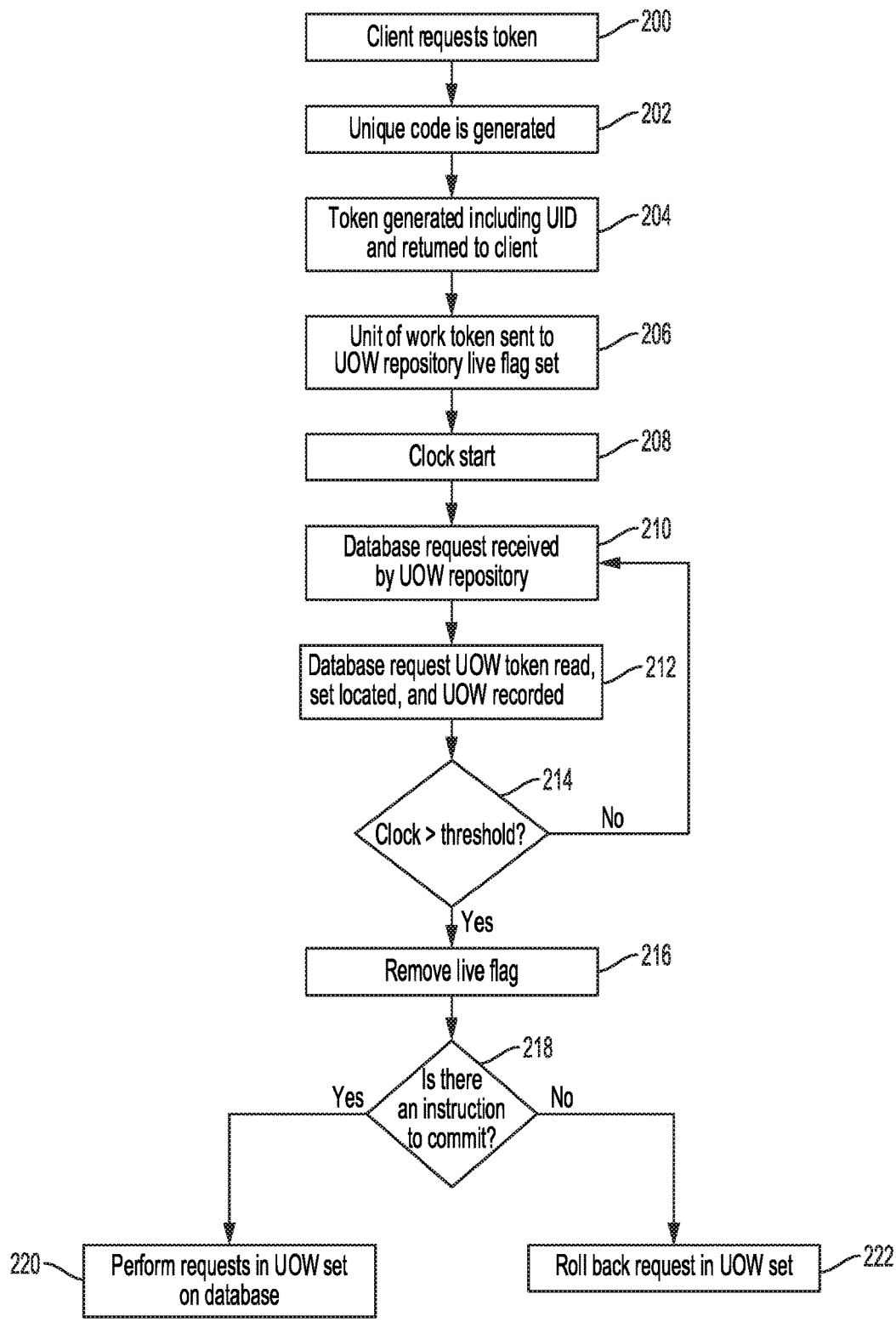
FIG. 2 illustrates an example process flow for recording and processing unit of work sets.

FIG. 2 discloses an example process flow for processing and recording unit of works sets on a computer system. Here, a client seeking to make modifications on a remotely hosted database requests a token that uniquely identifies a unit of work set for the modifications. The client requests a unit of work token at step 200. The token request is received by a processing device that could include any remote computer-readable medium including the server hosting the database or an application program interface that negotiates the interactions between the server and the client. At 202 a unique identifying service generates a unique identification code (UID) unique to the unit of work set and returns the code to the requesting device. At 204 the processing device generates a unit of work token that includes the unique identification code. The unit of work token may also include a number of parameters that indicate how the unit of work is to be handled. In some embodiments unit of work set parameters may be provided by the client in the token request. In other embodiments, the user may be prompted to provide parameters or the parameters may be automatically assigned to the unit of work token. In further embodiments, the unit of work token may include information pointing to the parameter locations. The parameters may be used to dynamically configure the unit of work set.

Examples of the parameters may include a maximum number of database requests that may be assigned to the unit of work set and/or an amount of time a unit of work set may remain live. Other embodiments may have parameters that additionally or alternatively include a designator designating if a unit of work set may be viewed before it is committed to the database and/or an instruction on how to handle the unit of work set when the unit of work set is closed. Additional parameters are also contemplated.

The unit of work token is then returned to the client. At 206 the unit of work set is created in a unit of work repository that may be located on the database or other remote server. A live flag may be set for the unit of work set that indicates that other requests may be added to the unit of work set. A clock may also start to monitor how long the unit of work token has been live at 208.

At 210 the client sends a database request to edit the database. This may include modifications to a value in the database, adding an entry to the database, deleting an entry in the database, or other database transactions. The database request may include a key associated with the database entry that the user is seeking to modify, the type of command that the user seeks to perform, and the unit of work token. If the command is an insert or update command the database request may also contain the data be added to the database. At 210 the database request is sent to the unit of work repository. At 212 the database reads the token, identifies which unit of work set to assign the database request, and records the database request in the unit of work set.

The key may be sent to a key store to retrieve a location pointer of the data to be inserted, updated or deleted and the location pointer may be stored in the unit of work repository. In other embodiments, the unit of work set may record the key but not the location pointer. While the unit of work set is live all database requests from a client are recorded in the unit of work set. At 214 the system determines whether the unit of work set is live. The process will return to 210 when it receives a new database request while the unit of work set is live.

There are a number of ways the system may determine whether the unit of work set is live at 214. In some embodiments, unit of work set parameters may include a duration threshold. The threshold may be included in the unit of work token. If the token includes a duration threshold, the clock that was initiated at 208 may be compared to the duration threshold. If the clock exceeds the threshold, it is determined that the unit of work set is no longer live and the unit of work set is closed. The parameters might also indicate a maximum number of records that can be assigned to a unit of work set and if the number of records in the unit of work set exceeds the threshold, the unit of work set is closed. For example, the unit of work repository may count the number of entries recorded in a set and signal to the application program interface when the set has closed and a new unit of work token is issued. Similarly a clock monitoring the time a unit of work token has been active may be compared to a duration indicated in the unit of work parameter and may signal the application program interface and unit of work repository to close the unit of work set and issue a new token. A client may also send an instruction to close a set. The instruction may additionally include an instruction to commit or rollback the unit of work set. The client may also request a new unit of work token manually. When the unit of work is closed, the live flag may be removed at 216.

At 218 the system evaluates the unit of work token or user instruction to determine whether the unit of work set will be committed or rolled-back. If the unit of work token indicates that the unit of work set should be committed to the database, the database requests are performed on the database. No action is taken on the database if the unit of work token or user instruction indicates that the unit of work set should be rolled-back, thus the requests are rolled back at 222. In other embodiments, the application programming interface or the server may prompt the user to instruct the system to commit or rollback the database requests in the unit of work set upon closing the unit of work set. If it is determined that the database requests are to be performed on the database, the database requests in the unit of work set are committed at 220. In other embodiments, the system may automatically request a new unit of work token and return to 200. In further embodiments, the system may send an error to the client if a request with the unit of work token is received after the unit of work set it closed. The error may additionally prompt the user to provide an instruction to commit or rollback the closed unit of work set. Thus, clients will be able to commit or rollback multiple database requests at one time that were made over a number of different HTTP sessions.

Additionally, the parameters may include an instruction allowing or prohibiting other clients to view or edit data that is the subject of database requests that has not been committed. The parameters may also include instructions to delete the database requests in the unit of work set upon a decision to rollback the requests. It may further include instructions to delete the database requests in the unit of work set after they have been performed on the database. In an embodiment, the unit of work repository may be instructed to delete a unit of work set an duration of time after they have been committed or rolled-back. This may include a general instruction to delete the unit of work sets after a predetermined time or after a time specified by the parameters of the set. Unit of work sets may also be deleted when the unit of work repository has reached capacity or a given file size.

In key/value database embodiments, the system may allow or prohibit other clients from viewing or editing data that is the object of a non-committed database request. In these embodiments, the key associated with the location pointer may be flagged when a database request is sent that effects the data at that location. The flag may be removed from the data implicated by the database requests in a unit of work set when the set is closed after the rollback has been completed or after the database requests in the unit of work set have been committed to the database.

Figure 3:
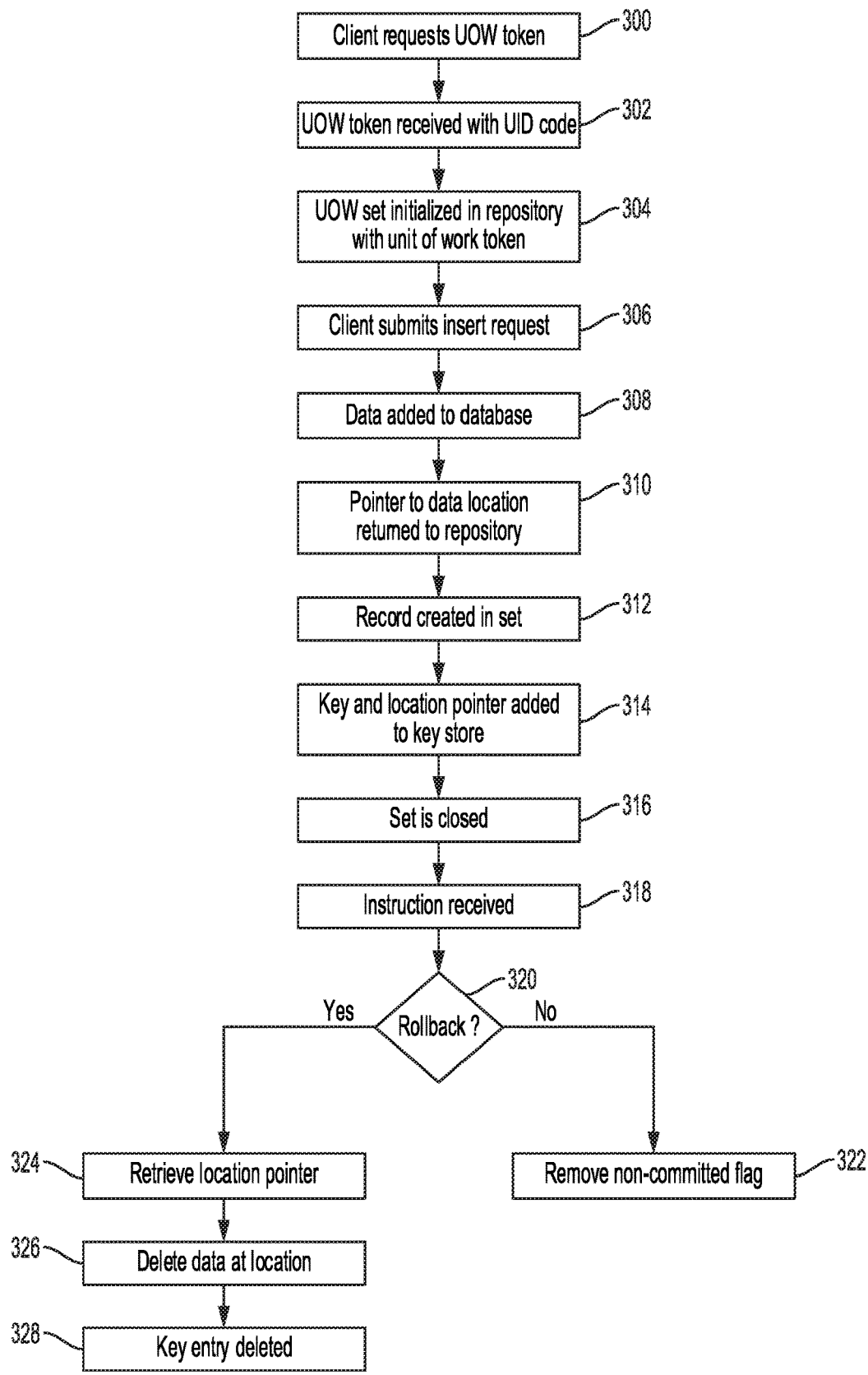
FIG. 3 illustrates an exemplary method of recording, committing, and rolling-back an insert request.

FIG. 3 shows an exemplary method of recording, performing, and rolling-back an update request. At 300 the client requests a unit of work token via an application programming interface. The unit of work token is returned from the application programming interface at 302 with a unique identification code and parameters indicating a duration of time that the unit of work token may remain live, a maximum number of records that may be recorded in the unit of work set, and an instruction to commit or rollback the unit of work set database requests when the unit of work set is closed. In some embodiments the client may indicate the parameters for the unit of work token. In other embodiments the application programming interface may include default parameters in the unit of work token or prompt the client to send parameters for the unit of work token. At 304 the unit of work set is initialized in a unit of work repository. At 306 the client submits an insert request including a key and a data value to the unit of work repository. At 308 the unit of work repository sends a request to the database to add data to the database and the data is added to the database at a location. The location may be dynamically determined based on the location of available storage on the database. At 310 a pointer to the data location storing the data is returned to the unit of work repository. At 312 a record is created in the unit of work repository in the live unit of work set including the key and the pointer to the location of the data on the database, the repository may additionally record the data. At 314 the key and location pointer are added to the key store and a non-committed flag is set in the key store for the key. The non-committed flag may prohibit other users from accessing the data. For example, a user searching for values assigned to the key may receive a 404 error while the non-committed flag is set. At 316 the set is closed and the commit or rollback instruction is retrieved from the unit of work token at 318. At 320 the unit of work record is read by the processor. If the token for the unit of work set indicates that the database requests contained therein should be committed, the non-committed flag is removed at 322. The data may then be retrieved by any user with the proper credentials using the key. If the token for the unit of work indicates that the database request contained therein should be rolled-back at 320 the location pointer for the data is retrieved from the key store at 324 and the data at that location is deleted from the database at 326. In other embodiments, the location pointer may be recorded in the unit of work set in the unit of work repository and accessed from the repository directly at 324. After the data is deleted the key entry (including the key, location pointer, and non-committed flag) is deleted from the key-store at 328. The record, commit, and rollback method for an insert request explained above may also be performed with a delete or update request.

Figure 4:
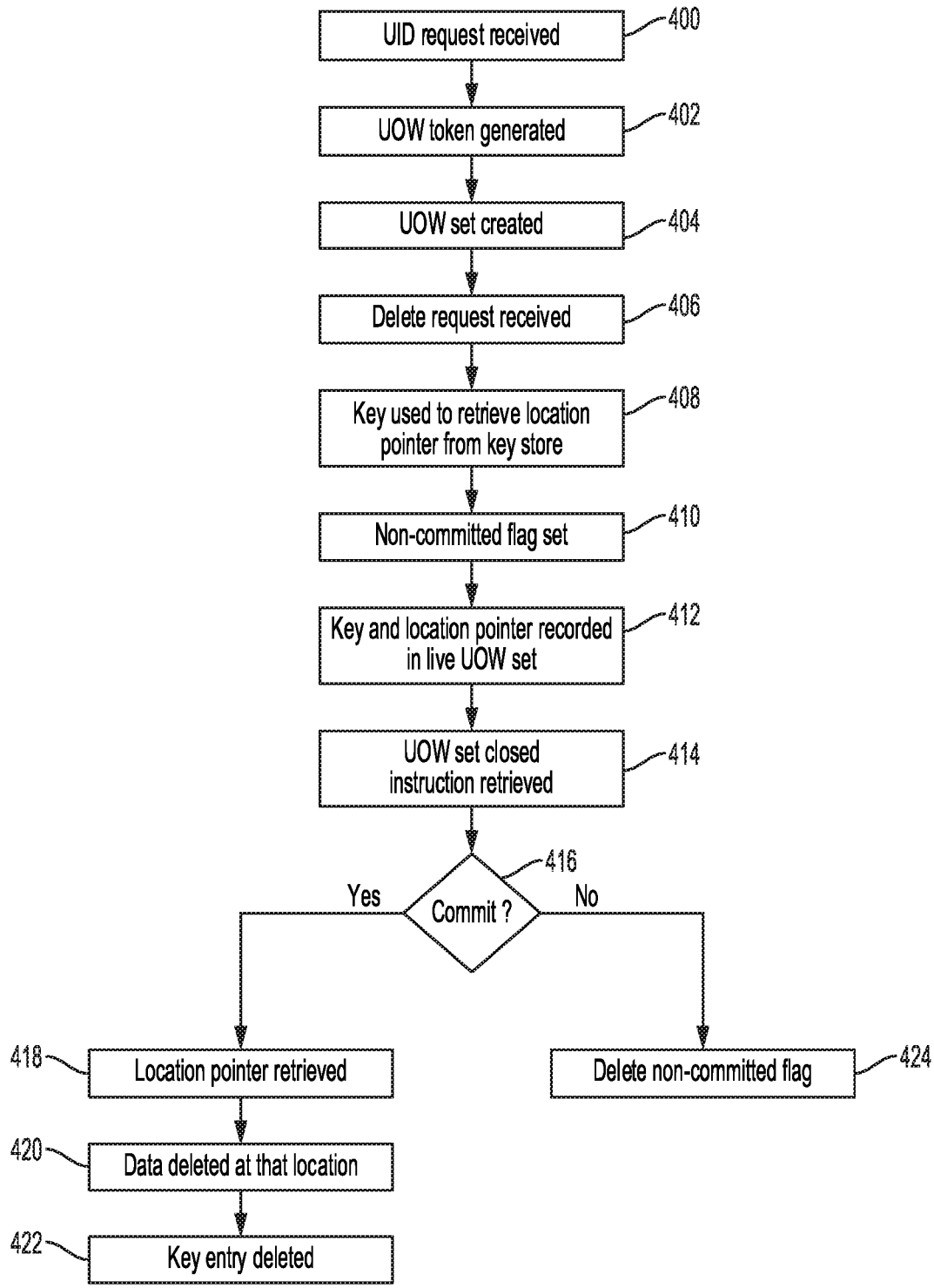
FIG. 4 illustrates an exemplary method of recording, committing, and rolling-back a delete request.

FIG. 4 shows exemplary method of recording, performing, and rolling-back a delete request. At 400 a unique identification service receives a request for a unique identification code via an application programming interface. The unit of work token is generated at 402 with the unique identification code and parameters for handling the unit of work set assigned to the unique identification code. At 404 a unit of work set is created in a unit of work repository identified by the unit of work token. At 406 the system receives a delete request from a client including a key for the data to be deleted and the unit of work token. At 408 the location pointer to the data paired with the key is retrieved from the key store and a non-committed flag is set in the key store for the key at 410. At 412 the repository finds a live unit of work set and creates a record in the unit of work set including the key and location pointer. The process is repeated for every database request having the unit of work token. At 414 the set is closed and the system may prompt the user to issue a commit or rollback instruction. In other embodiments, the system may receive an instruction to close and a commit or rollback to a live key set. In other embodiments, the instruction may be retrieved from the token.

If the instruction received at 416 indicates that the database requests should be committed, the system retrieves the location pointer from the unit of work repository and the location pointer is retrieved at 418. At 420 the data is removed from the database. At 422 the key, location pointer, and non-committed flag is removed from the key store. If the instruction received at 416 is to rollback the database requests the non-committed flag is deleted from the key store at 424. In other embodiments, the data may be deleted from the database before the unit of work is closed and the data stored in the unit of work set in the unit of work repository. In these embodiments, the system retrieves the location pointer and data and inserts the data back in to the location indicated by the location pointer if instructed to rollback the unit of work set. The process is repeated for every database request in the unit of work set. The record, commit, and rollback method for a delete request explained above may also be performed for an insert or update request.

Figure 5:
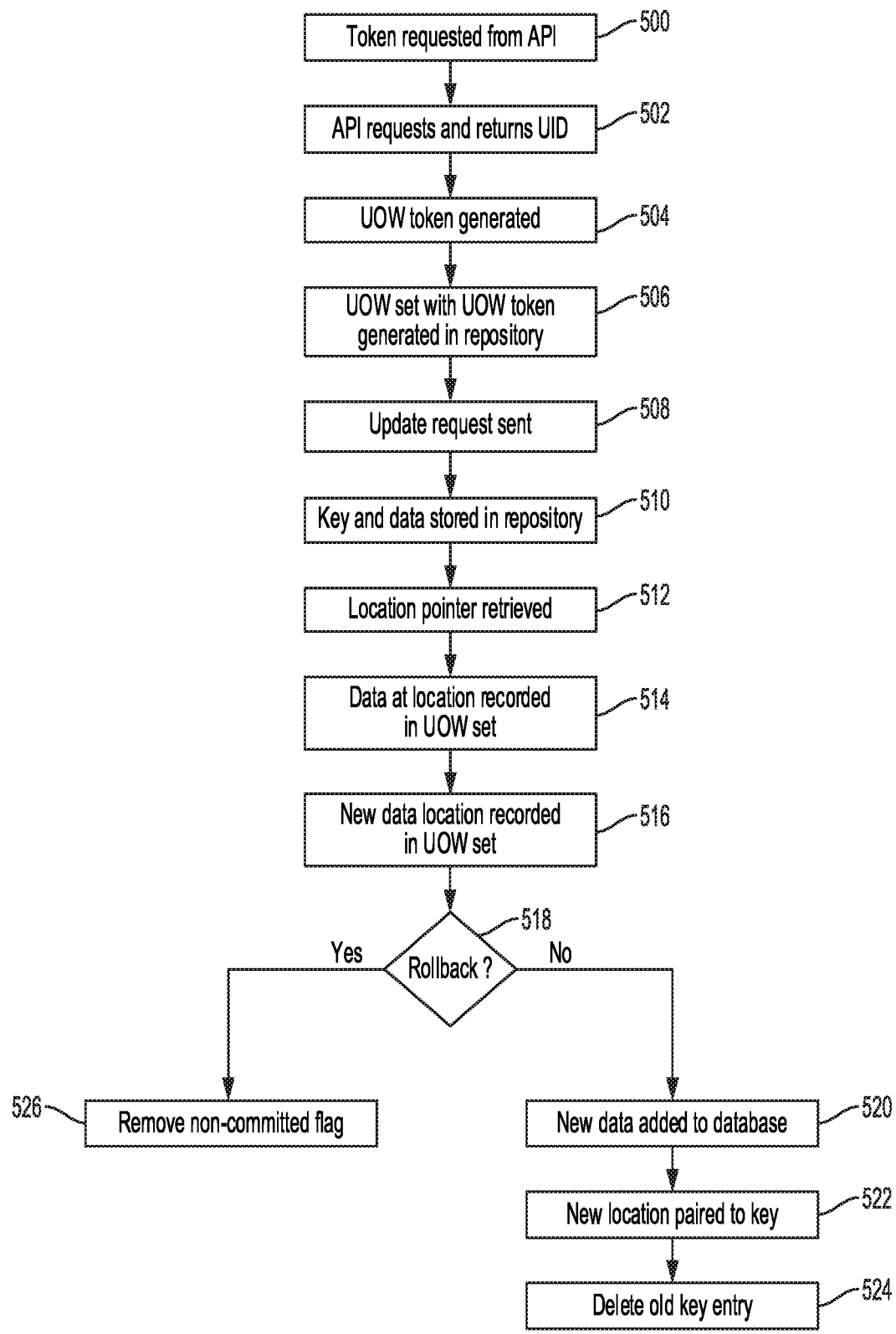
FIG. 5 illustrates an exemplary method of recording, committing, and rolling-back an update request.

FIG. 5 shows an exemplary method of recording, performing, and rolling-back an update request. At 500 the client requests a unit of work token via an application programming interface. An application programming interface requests a unique identification code and returns the unique identification code to the client at 502. At 504 the client generates a unit of work token with the unique identification code to send to a unit of work repository. At 506 a unit of work set is created in a unit of work repository. At 508 the client submits an update request including a key and a new data value to the database that is received by the unit of work repository and key store. The system then locates the unit of work set identified by the unique identification code in the unit of work repository. In some embodiments, the process at 500 may be initiated by the receipt of a database request. At 510 the key and new data are recorded in the unit of work set in the unit of work repository with the unique identification code. At 512 the data location pointer paired to the key in the key store is retrieved and recorded to the unit of work set. At 514 the systems retrieves the data at the location pointer and records it to the unit of work set. At 516 the system identifies an empty location on the database and a location pointer to the new data location is recorded in the unit of work set. In some embodiments, the data location pointer may be included in the key store with a new key at 516 and the new key is recorded in the unit of work set. A non-committed flag may additionally be set in the key store for the key and the new key. Additional insert, update, and delete requests may be performed and recorded in the unit of work set until the unit of work set is closed at 518. The unit of work set may be closed in accordance with any of the embodiments described herein. At 518 the system determines whether to commit or rollback the unit of work set. If the system determines that the data is to be committed, the new data will be written to the database at the new data location at 520. At 522 the new location is written to the key store and paired with the key. At 524 the old location pointer and key entry is deleted from the key store. If the system is instructed to rollback the unit of work set, the non-committed flag is removed from the key store at 526. The commit or rollback is performed on data in the unit of work set.

As described above, the data may be inserted and deleted before or after the unit of work set is closed and the commit or rollback performed. In embodiments that add or delete the data before the unit of work set is closed and committed or rolled-back, the data and location pointer are recorded in the unit of work set while it is live. When a rollback is performed, deleted data will be written back on the database and inserted data will be deleted.

Figure 6:
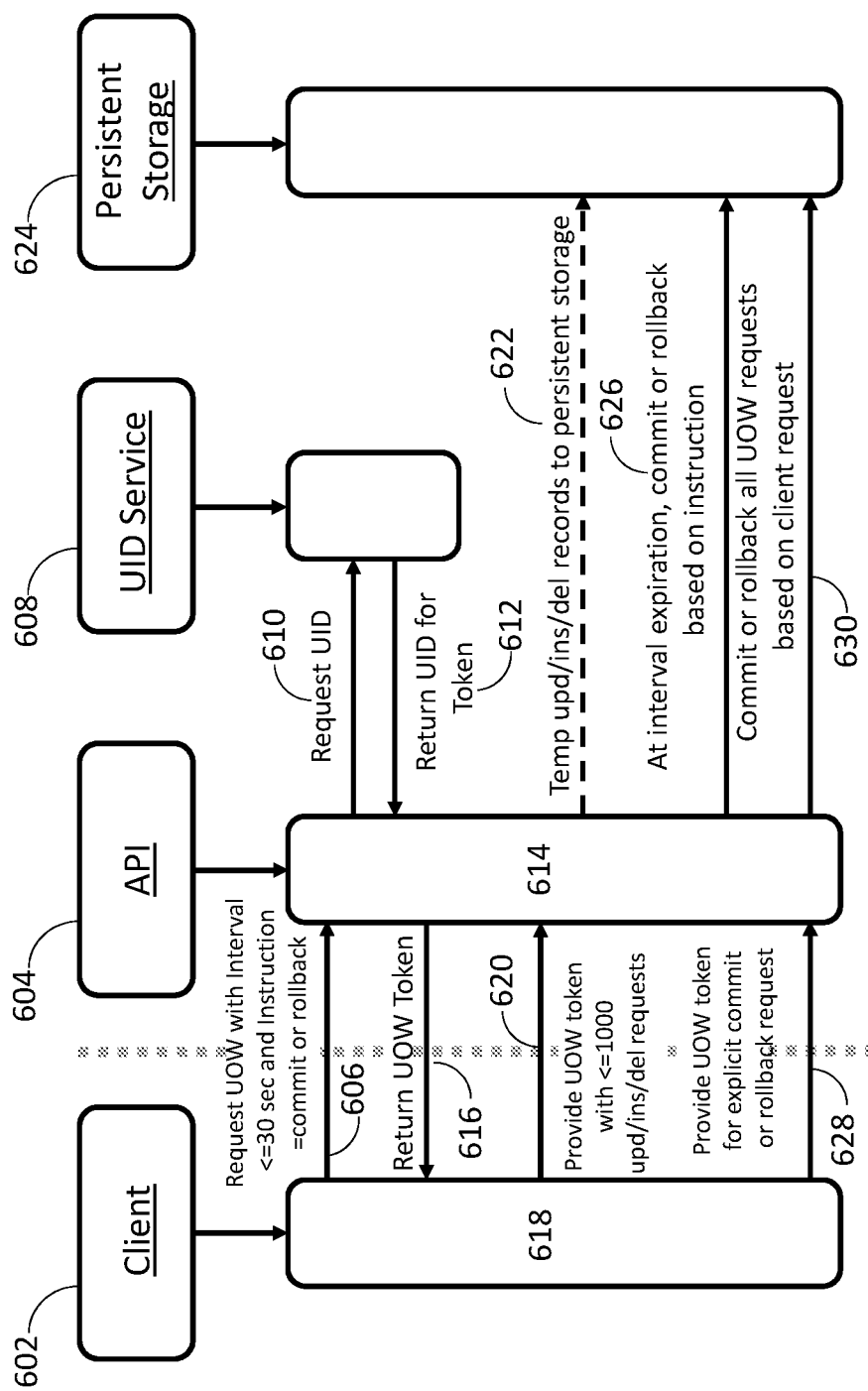
FIG. 6 illustrates an example method embodiment operating on computer systems.

FIG. 6 shows an example of a client committing and rolling-back data. A client 602 may be any type of computer storage device connected to a network. The client is connected to an application programming interface 604. At 606 the client sends a unit of work token request to the application programming interface 604. In this embodiment, the token request includes a parameter indicating that the interval duration threshold is 30 seconds by way of example, the token request also includes an instruction to commit or rollback the data in the unit of work set automatically 30 seconds after initiating the unit of work set. The application programming interface 604 is connected to unique identification service 608. At 610 the application programming interface 604 requests a unique identification code from the unique identification service 608. The unique identification service 608 returns a unique identification code at 612. At 614 the application programming interface creates a unit of work token including the parameters and the unique identification code. At 616 the unit of work token is returned to the client 602 and the connection is terminated.

At 618 the client 602 makes an insert, update, or delete request to the application programming interface and a connection is created. The request is received by the application programming interface 604 and the connection is terminated at 620. At 622 the request and unit of work token are recorded in temporary storage located on the persistent storage device 624. If the application programming interface determines that the duration of time since the token has been received has exceeded a threshold, here 30 seconds, it may instruct the persistent storage system 624 to commit or rollback unit of work requests with the unit of work token at 626. In some embodiments, the requests are automatically rolled-back if the threshold is reached. In other embodiments the system consults an instruction defined in the token parameter to either commit or rollback the unit of work set or prompt the client to submit an instruction. Other embodiments may determine whether to commit or rollback the set upon exceeding other threshold parameters, such as the number of records in the unit of work set.

If the set is not committed or rolled back at 626, the client 602 may send, via the application programming interface 604, an instruction to commit or rollback the unit of work set and the token for the unit of work at 628. At 630 the application processing device sends an instruction to commit or rollback unit of work requests with the unit of work token.

The various embodiments described above are provided by way of illustration only and should not be construed to limit the scope of the disclosure. For example, the principles herein could be used in non-key/value type databases. Various modifications and changes may be made to the principles described herein without following the example embodiments and applications illustrated and described herein, and without departing from the spirit and scope of the disclosure.

The invention claimed is:

1. A data storage system comprising:
   one or more remote computer-readable storage mediums configured to form a non-persistent stateless connection with a remotely located client computer;
   one or more processors associated with the one or more remote computer-readable storage mediums;
   a database hosted on the one or more remote computer-readable storage mediums;
   the one or more remote computer-readable storage mediums having instructions stored which, when executed by the one or more processors, cause the one or more remote computer-readable storage mediums to perform actions comprising:

generating a unit of work token containing a unique identification code and one or more parameters;
recording the unit of work token in a unit of work repository; generating a unit of work set in the unit of work repository;
associating the unit of work set with the unit of work token;
providing the unit of work token to the remotely located client computer;
during a first time interval:
receiving, from the remotely located client computer and from multiple different HTTP sessions of connectivity, a plurality of database requests, each database request of the plurality of database requests including the unit of work token and an instruction to modify data of the database;
identifying the associated unit of work set based on the unit of work token;
recording each database request of the plurality of database requests in the unit of work set associated with the unit of work token; and
during a second time interval, committing or rolling-back each database request of the plurality of database requests in the unit of work set based on an instruction to commit or to rollback the instruction of each database request recorded in the unit of work set.

2. The data storage system of claim 1, wherein the database is a key/value database.

3. The data storage system of claim 2, wherein the database includes a key store comprising of keys associated with respective data location pointers.

4. The data storage system of claim 3, wherein each database request of the plurality of database requests includes the associated key.

5. The data storage system of claim 4, wherein the instruction includes commands to at least one of update, insert, or delete data associated with the key.

6. The data storage system of claim 1, wherein the one or more parameters include a threshold and the instruction to commit or to rollback the instruction of each database request recorded in the unit of work set when the threshold is exceeded.

7. The data storage system of claim 6, wherein the one or more parameters are assigned a default value.

8. The data storage system of claim 6, wherein the one or more parameters are defined by a user.

9. The data storage system of claim 6, wherein the threshold is a number of records or a duration of time.

10. A non-transitory computer-readable storage medium storing instructions which, when executed by a computing device, cause the computing device to perform a method comprising:
generating a unit of work set and a corresponding unique identification code;
sending the unique identification code to a remotely located client computer with a non-persistent stateless connection with one or more computer-readable storage mediums;
while the unit of work set is open:
receiving, from the remotely located client computer and from two or more different HTTP sessions of connectivity, two or more database requests, each database request of the two or more database requests including the unique identification code and an instruction to modify data of a database hosted on the one or more remote computer-readable storage mediums;
recording the two or more database requests in the unit of work set; and
committing the instruction of each database request of the two or more database requests in the unit of work set or rolling-back the instruction of each database request of the two or more database requests recorded in the unit of work set after the unit of work set is closed.

11. The non-transitory computer-readable storage medium of claim 10, storing additional instructions which, when executed by the computing device, cause the computing device to perform a method comprising:
denying a user access to the data of the database that is subject to the two or more database requests.

12. The non-transitory computer-readable storage medium of claim 10, wherein the two or more database requests are committed or rolled-back based on a user-defined instruction.

13. The non-transitory computer-readable storage medium of claim 10, further comprising:
a key/value database;
an application programming interface; a unique identification service; and
a unit of work repository.

14. A method for processing database requests on a database hosted on a stateless non-persistent computing environment, the method comprising of:
generating a unique identification code to identify a unit of work set;
generating the unit of work set at a storage location and assigning one or more parameters to the unit of work set;
providing the unique identification code to a remotely located client computer;
while the unit of work set is open:
receiving, by a remote server and from the remotely located client computer from multiple different HTTP sessions, a plurality of database requests, each database request of the plurality of database requests including the unique identification code, and an instruction to modify data of a database;
recording each database request of the plurality of database requests in the unit of work set based on the unique identification code;
closing the unit of work set based the one or more parameters assigned to the unit of work set; and
determining whether to perform the instructions of each database request of the plurality of database requests recorded in the unit of work set after the unit of work set is closed.

15. The method of claim 14, wherein the one or more parameters includes a parameter indicating whether to perform each database request of the plurality of database requests in the unit of work set on the database.

16. The method of claim 14, wherein the unit of work set is closed after a threshold time.

17. The method of claim 14, wherein the unit of work set is closed if the unit of work set is determined to contain a threshold number of database requests.

18. The method of claim 14, wherein the one or more parameters includes a parameter indicating whether the remotely located client computer accessing the remote server may view database requests in the unit of work set.

19. The method of claim 14, wherein the instruction of each database request includes inserting, updating, or deleting database entries.

20. The method of claim 14, wherein the database is a key/value database.

* * * * *